(No Model.)

L. B. JONES.
JUNCTION CLAMP FOR ELECTRIC WIRES.

No. 350,829. Patented Oct. 12, 1886.

Witnesses:
O. W. M. Evans
Alex. W. Dow

Inventor
Lucian Bigelow Jones
Per Attys:—
Reynolds & Kelton

UNITED STATES PATENT OFFICE.

LUCIAN BIGELOW JONES, OF BEDFORD, ASSIGNOR TO THE FORSAITH ELECTRICAL MACHINE COMPANY, OF MANCHESTER, NEW HAMPSHIRE.

JUNCTION-CLAMP FOR ELECTRIC WIRES.

SPECIFICATION forming part of Letters Patent No. 350,829, dated October 12, 1886.

Application filed February 9, 1886. Serial No. 191,366. (No model.)

*To all whom it may concern:*

Be it known that I, LUCIAN BIGELOW JONES, of Bedford, in the county of Hillsborough and State of New Hampshire, have invented a certain new and useful Improved Junction-Clamp for Electric Wires; and I do hereby declare that the following is a full, clear, and exact description of the same.

My invention has reference to the means used for connecting the main and branch conducting-wires in any electric-lighting system, but is especially useful for incandescent installations. Up to the present time such junctions have been made by scraping off the insulating material on the main wire at the point desired, and then soldering the branch wire thereto. This, beside being comparatively costly, takes time to carry out, and when the junction happens to be made in the wrong place it cannot be changed without leaving the main wire badly damaged.

For the purpose of obviating these difficulties is produced my junction-clamp, which may be thus briefly described. At the points at which the junctions of the main and branch wires are to be effected, I use clamps made of conducting material, each having, by preference, a foot into which the branch line is led and on which the main line rests, and a curved arm threaded to receive a screw, the pointed end of which pierces through the insulating material on the main wire, thereby making contact between the main and branches.

For full comprehension of the invention, reference must be had to the annexed drawings, in which—

Figure 1:
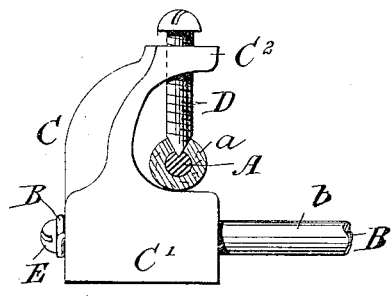
Figure 2:
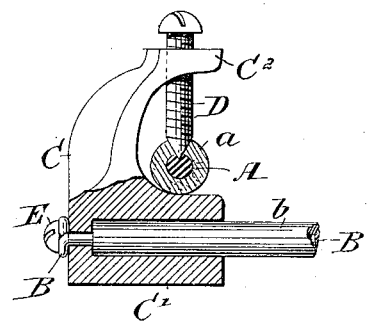
Figure 3:
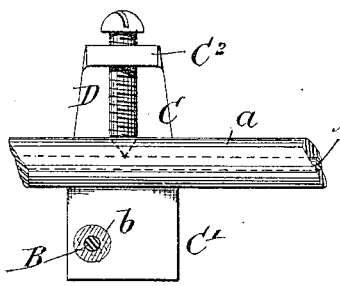

Figure 1 is a side view, and Fig. 2 a part sectional view, of the clamp, both showing the main line in section and the branch in elevation. Fig. 3 is a front view showing the main wire in elevation and the branch in section, and Fig. 4 a rear view showing connection of branch line with clamp.

Similar letters of reference indicate like parts.

A is the main wire and $a$ the insulating material incasing it, B being the branch wire and $b$ similar insulating material.

Figure 4:
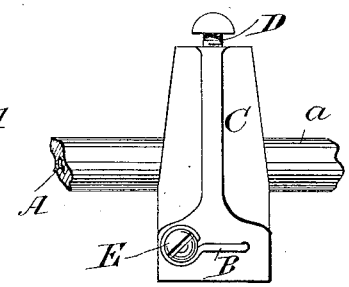

C is the clamp, constructed, preferably, as shown in the drawings, with a foot, C', pierced to receive the branch wire, and an arm, $C^2$, threaded to admit of the passage through it of the pointed screw D, which cuts down through the insulating material $a$, and makes electrical contact with the wire A. The wire B is preferably secured to the clamp C, as shown in Fig. 4, by a set-screw, E, round which it is wound.

It will be seen that by this arrangement the connection of the main and branch wires in any electrical plant can be very easily and quickly effected, the branch line being in contact with the clamp, and the main line being also brought into contact with it by means of the screw D, passing through the insulating material. This will neither hurt the wire nor destroy perfect insulation, as the small hole made in the material is filled up by the body of the screw. It will also be seen that a knife-edged clamp or equivalent device may be used in place of the screw without departing from my invention.

What I claim is as follows:

1. In an electric-lighting system, the combination, with main and branch wires, of a clamp of conductive material to which branch wire is connected, and a screw passing through such clamp and in electrical contact with main wire which is otherwise insulated from clamp, all substantially as herein set forth.

2. The junction-clamp for electric wires herein described, consisting of the foot C', having screw E, and perforated to hold one of the wires, arm $C^2$, and pointed screw D, serving to hold and form contact with the other wire, all being made of conductive material, substantially as described.

LUCIAN BIGELOW JONES.

Witnesses:
NATHAN P. HUNT,
E. R. WHITNEY.